United States Patent
Murray

(10) Patent No.: US 6,378,639 B1
(45) Date of Patent: Apr. 30, 2002

(54) OIL DRIP PAN ASSEMBLY FOR A VEHICLE

(76) Inventor: Patrick W. Murray, 77 Narragansett Ave., Narragansett, RI (US) 02882

(*) Notice: Subject to any disclaimer, the term of this patent is extended or adjusted under 35 U.S.C. 154(b) by 0 days.

(21) Appl. No.: 09/663,160

(22) Filed: Sep. 15, 2000

(51) Int. Cl.$^7$ .......................... B62D 25/20; B62D 27/00; F16N 31/00; B65D 1/34
(52) U.S. Cl. ...................... 180/69.1; 184/106; 296/38; 220/573
(58) Field of Search .................. 180/69.1; 184/106, 184/1.5; 296/38; 225/108; 220/573

(56) References Cited

U.S. PATENT DOCUMENTS

| | | | |
|---|---|---|---|
| 1,182,378 A | * 5/1916 | Jewell | 180/69.1 |
| 2,618,351 A | 11/1952 | Giacosa | |
| 3,329,231 A | * 7/1967 | Takenouchi | 180/69.1 |
| 3,669,204 A | 6/1972 | Andrews | |
| 3,809,175 A | * 5/1974 | Andrews | 180/69.1 |
| 4,577,713 A | 3/1986 | Moon | |
| 4,750,775 A | 6/1988 | Miller | |
| 4,875,537 A | 10/1989 | Garnatz et al. | |
| 4,909,355 A | * 3/1990 | Ramos | 180/106 |
| 5,143,178 A | * 9/1992 | Latham, Jr. | 184/106 |
| 5,404,848 A | * 4/1995 | Nelson | 123/198 E |
| D363,944 S | 11/1995 | McCarter | |
| 5,526,900 A | * 6/1996 | Mason | 184/106 |
| 5,839,531 A | * 11/1998 | McGee | 180/69.1 |
| 5,921,602 A | * 7/1999 | Holbus | 296/38 |

FOREIGN PATENT DOCUMENTS

JP    0124578    * 7/1985 ................ 180/69.1

* cited by examiner

Primary Examiner—Brian L. Johnson
Assistant Examiner—Gerald Klebe

(57) ABSTRACT

An oil drip pan assembly for a vehicle for preventing oil from dripping onto the ground from a vehicle. The oil drip pan assembly for a vehicle includes a bracket member being adapted to securely attached to an undercarriage of a vehicle; and also includes a receptacle being removably fastened to the bracket member; and further includes an oil absorbent member being removably supported upon the receptacle for absorbing oil being dripped about an oil pan or from gaskets in the engine; and also includes a screen member being securely and removably disposed upon the receptacle to securely retain the oil absorbent member upon the receptacle.

10 Claims, 3 Drawing Sheets

OIL DRIP PAN ASSEMBLY FOR A VEHICLE

BACKGROUND OF THE INVENTION

1. Field of the Invention

The present invention relates to an auxiliary oil drip pan for a vehicle and more particularly pertains to a new oil drip pan assembly for a vehicle for preventing oil from dripping onto the ground from a vehicle.

2. Description of the Prior Art

The use of an auxiliary oil drip pan for a vehicle is known in the prior art. More specifically, an auxiliary oil drip pan for a vehicle heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,875,537; U.S. Pat. No. 4,577,713; U.S. Pat. No. Des. 363,944; U.S. Pat. No. 3,669,204; U.S. Pat. No. 2,618,351; and U.S. Pat. No. 4,750,775.

While these devices fulfill their respective, particular objectives and requirements, the aforementioned patents do not disclose a new oil drip pan assembly for a vehicle. The inventive device includes a bracket member being adapted to securely attached to an undercarriage of a vehicle; and also includes a receptacle being removably fastened to the bracket member; and further includes an oil absorbent member being removably supported upon the receptacle for absorbing oil being dripped about an oil pan or from gaskets in the engine; and also includes a screen member being securely and removably disposed upon the receptacle to securely retain the oil absorbent member upon the receptacle.

In these respects, the oil drip pan assembly for a vehicle according to the present invention substantially departs from the conventional concepts and designs of the prior art, and in so doing provides an apparatus primarily developed for the purpose of preventing oil from dripping onto the ground from a vehicle.

SUMMARY OF THE INVENTION

In view of the foregoing disadvantages inherent in the known types of an auxiliary oil drip pan for a vehicle now present in the prior art, the present invention provides a new oil drip pan assembly for a vehicle construction wherein the same can be utilized for preventing oil from dripping onto the ground from a vehicle.

The general purpose of the present invention, which will be described subsequently in greater detail, is to provide a new oil drip pan assembly for a vehicle which has many of the advantages of the auxiliary oil drip pan for a vehicle mentioned heretofore and many novel features that result in a new oil drip pan assembly for a vehicle which is not anticipated, rendered obvious, suggested, or even implied by any of the prior art an auxiliary oil drip pan for a vehicle, either alone or in any combination thereof.

To attain this, the present invention generally comprises a bracket member being adapted to securely attached to an undercarriage of a vehicle; and also includes a receptacle being removably fastened to the bracket member; and further includes an oil absorbent member being removably supported upon the receptacle for absorbing oil being dripped about an oil pan or from gaskets in the engine; and also includes a screen member being securely and removably disposed upon the receptacle to securely retain the oil absorbent member upon the receptacle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new oil drip pan assembly for a vehicle which has many of the advantages of the auxiliary oil drip pan for a vehicle mentioned heretofore and many novel features that result in a new oil drip pan assembly for a vehicle which is not anticipated,.rendered obvious, suggested, or even implied by any of the prior art an auxiliary oil drip pan for a vehicle, either alone or in any combination thereof.

It is another object of the present invention to provide a new oil drip pan assembly for a vehicle which may be easily and efficiently manufactured and marketed.

It is a further object of the present invention to provide a new oil drip pan assembly for a vehicle which is of a durable and reliable construction.

An even further object of the present invention is to provide a new oil drip pan assembly for a vehicle which is susceptible of a low cost of manufacture with regard to both materials and labor, and which accordingly is then susceptible of low prices of sale to the consuming public, thereby making such oil drip pan assembly for a vehicle economically available to the buying public.

Still yet another object of the present invention is to provide a new oil drip pan assembly for a vehicle which provides in the apparatuses and methods of the prior art some of the advantages thereof, while simultaneously overcoming some of the disadvantages normally associated therewith.

Still another object of the present invention is to provide a new oil drip pan assembly for a vehicle for preventing oil from dripping onto the ground from a vehicle.

Yet another object of the present invention is to provide a new oil drip pan assembly for a vehicle which includes a bracket member being adapted to securely attached to an undercarriage of a vehicle; and also includes a receptacle being removably fastened to the bracket member; and further includes an oil absorbent member being removably supported upon the receptacle for absorbing oil being dripped about an oil pan or from gaskets in the engine; and also includes a fire retardant screen member being securely and removably disposed upon the receptacle to securely retain the oil absorbent member upon the receptacle and to prevent fires from the captured oil.

Still yet another object of the present invention is to provide a new oil drip pan assembly for a vehicle that essentially protects the environment by preventing oil from dripping on the ground and getting into the underground water supply.

Even still another object of the present invention is to provide a new oil drip pan assembly for a vehicle that is easy and convenient to install to the undercarriage of the vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
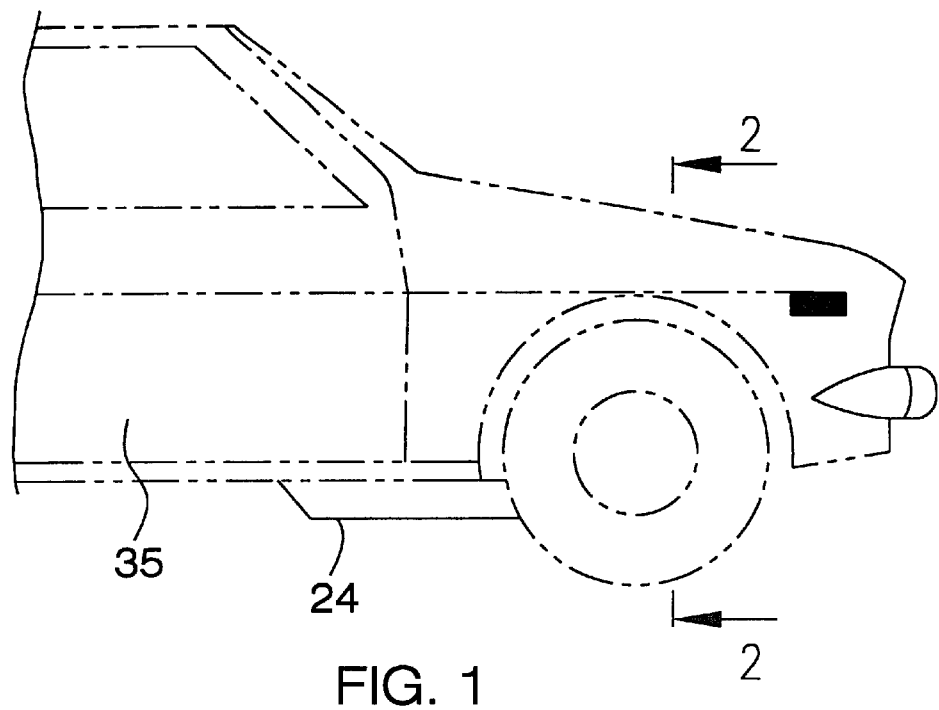
FIG. 1 is a side elevational view of a new oil drip pan assembly for a vehicle according to the present invention and being shown mounted to the undercarriage of the vehicle.
Figure 2:
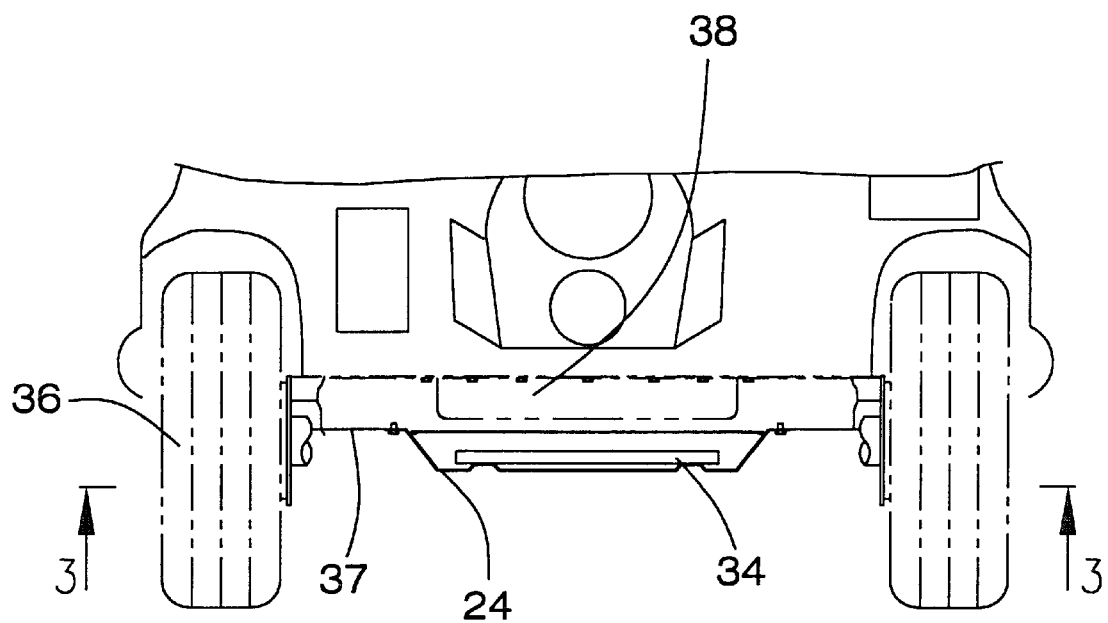
FIG. 2 is a rear elevational view of the present invention being mounted to the undercarriage of the vehicle.
Figure 3:
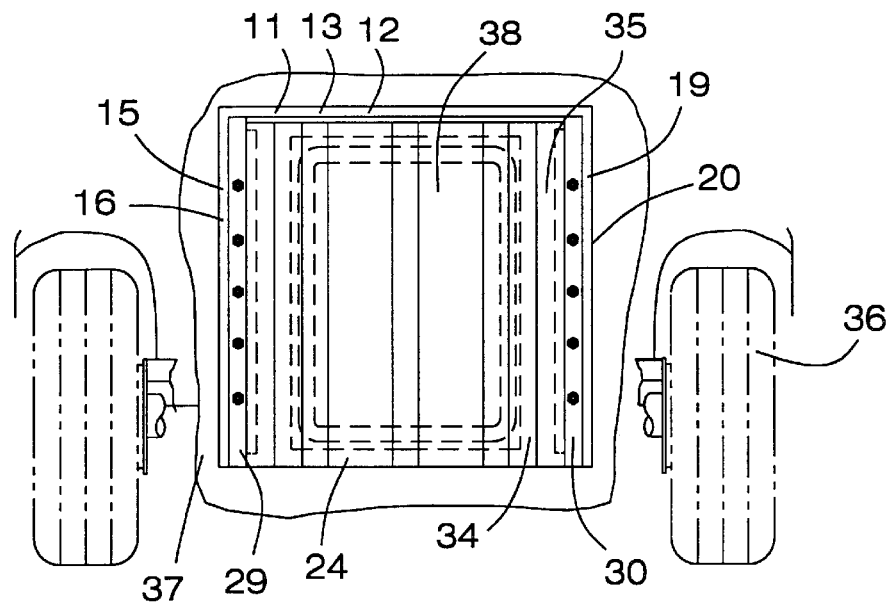
FIG. 3 is, a bottom plan view of the present invention being mounted to the undercarriage of the vehicle.
Figure 4:
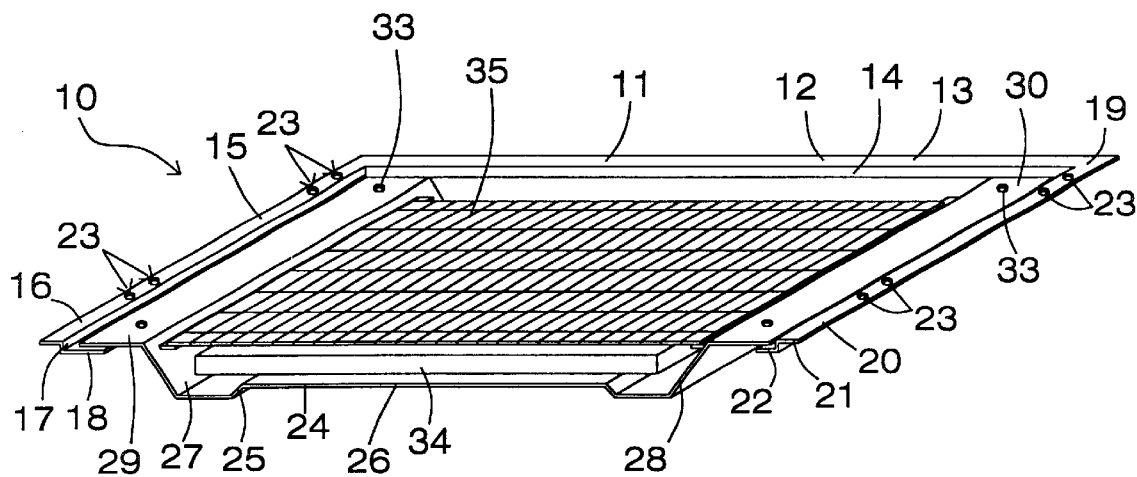
FIG. 4 is a perspective view of the present invention.
Figure 5:
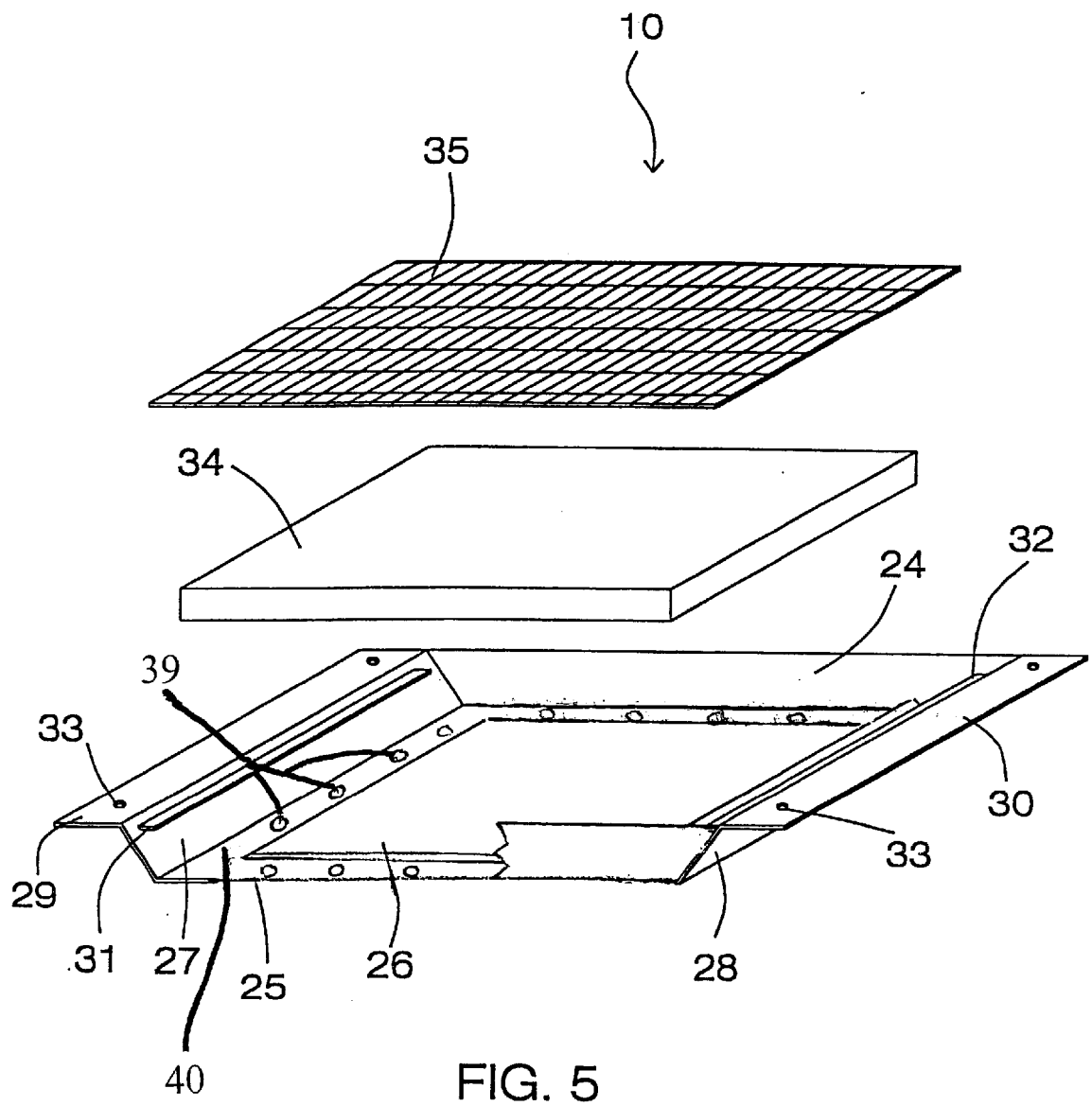
FIG. 5 is an exploded perspective view of the present invention.

With reference now to the drawings, and in particular to FIGS. 1 through 5 thereof, a new oil drip pan assembly for a vehicle embodying the principles and concepts of the present invention and generally designated by the reference numeral 10 will be described.

As best illustrated in FIGS. 1 through 5, the oil drip pan assembly for a vehicle 10 generally comprises a bracket member 11 being adapted to securely and conventionally attach to an undercarriage 37 of a vehicle 36. The bracket member 11 includes an elongate main member 12 having ends, and also includes elongate end members 15,19 securely and conventionally attached at the ends of the elongate main member 12 and extending generally perpendicular thereto. Each of the elongate main and end members 12,15,19 includes an elongate upper portion 13,16,20, and an elongate intermediate portion 14,17,21 integrally attached to a longitudinal edge of the elongate upper portion 13,16,20 and being angled relative to the elongate upper portion 13,16,20. The elongate intermediate portion 14,17, 21 is depended downwardly relative to the elongate upper portion 13,16,20. Each of the elongate end members 15,19 further includes an elongate lower portion 18,22 which is integrally attached to a longitudinal edge of a respective elongate intermediate portion 17,21 and which is angled relative to the elongate intermediate portion 17,21 for supporting a receptacle 24. The elongate intermediate portions 17,21 are horizontally extended inwardly of the bracket member 11 with the elongate upper portions 16,20 of the elongate end members 15,19 including holes 23 disposed therethrough for mounting the bracket member 11 to the undercarriage 37 of the vehicle 36.

The receptacle 24 is removably fastened to the bracket member 11. The receptacle 24 includes a bottom wall 25 and a side wall assembly 27,28 extending upwardly about a perimeter of the bottom wall 25 with the receptacle 24 further including elongate flange portions 29,30 integrally extending outwardly from a top of a portion of the side wall assembly 27,28 and being adapted to rest upon and securely fasten to the elongate lower portions 18,22 of the elongate end members 15,19. The side wall assembly 27,28 includes opposed side walls 27,28 with the elongate flange portions 29,30 extending along lengths of the opposed side walls 27,28 and having holes 33 disposed therethrough for fastening the receptacle 24 to the bracket member 11. The bottom wall 25 of the receptacle 24 has a centrally raised portion 26 to assist in absorption of oil by an oil absorbent member 34. and also has water drainage holes 39 being spaced along and disposed through a perimeter 40 of the bottom wall 25 outside the centrally raise portion 26. The receptacle 24 is essentially a pan being adapted to cover not only the oil pan 38 of the vehicle 36 but also a bottom of the engine of the vehicle 36.

The oil absorbent member 34 is removably supported upon the receptacle 24 for absorbing oil being dripped about an oil pan 38 or from gaskets in the engine. The oil absorbent member 34 is essentially a pad such as a sponge which is adapted to soak up and absorb oil being dripped into the receptacle 24. A screen member 35 is securely and removably disposed upon the receptacle 24 to securely retain the oil absorbent member 34 upon the receptacle 24. The receptacle 24 also includes elongate screen support members 31,32 being securely and conventionally attached to and extending from interiors of the opposed side walls 27,28 and being adapted to securely and removably retain the,screen member 35.

In use the user mounts the bracket member 11 to the undercarriage 37 of the vehicle 38 with clamps or U-bolts with the bracket member 11 also having the capability of pivoting upon the elongate main member 12 of the bracket member 11 to facilitate removal of the receptacle 24 which is supported upon the elongate lower portions 18,22 of the bracket member 11. The user places the oil absorbent pad 34 in the receptacle 24 and securely retains it with the screen member 35. Periodically, the user should remove the receptacle 24 from the bracket member 11 to be able to remove and dispose of the saturated oil absorbent pad 34. Water received in the receptacle 24 is allowed to drain through the water drainage holes 39 in the bottom wall 25 thereof.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An oil drip pan assembly for a vehicle comprising:
    a bracket member being adapted to securely attach to an undercarriage of a vehicle;
    a receptacle being removably fastened to said bracket member;
    an oil absorbent member being removably supported upon said receptacle for absorbing oil being dripped about an oil pan or from gaskets; and
    a fire retardant screen member securely and removably disposed upon said receptacle to securely retain said oil absorbent member upon said receptacle and to prevent fires;
        wherein said bracket member includes an elongate main member having ends, and also includes elongate end members securely attached at said ends of said elongate main member and extending generally perpendicular thereto; and
        wherein each of said elongate main and end members includes an elongate upper portion, and an elongate intermediate portion integrally attached to a longitudinal edge of said elongate upper portion and being angled relative to said elongate upper portion, said elongate intermediate portion being depended downwardly relative to said elongate upper portion.

2. An oil drip pan assembly for a vehicle as described in claim 1, wherein each of said elongate end members further includes an elongate lower portion which is integrally attached to a longitudinal edge of a respective said elongate intermediate portion and which is angled relative to said elongate intermediate portion for supporting said receptacle, said elongate intermediate portions being horizontally extended inwardly of said bracket member.

3. An oil drip pan assembly for a vehicle as described in claim 1, wherein said elongate upper portions of said elongate end members include holes disposed therethrough for mounting said bracket member to the undercarriage of the vehicle.

4. An oil drip pan assembly for a vehicle as described in claim 2, wherein said receptacle includes a bottom wall and a side wall assembly extending upwardly about a perimeter of said bottom wall, said receptacle further including elongate flange portions extending outwardly from a top of a portion of said side wall assembly and being adapted to rest upon and securely fasten to said elongate lower portions of said elongate end members.

5. An oil drip pan assembly for a vehicle as described in claim 4, wherein said side wall assembly includes opposed side walls, said elongate flange portions extending along lengths of said opposed side walls and having holes disposed therethrough for fastening said receptacle to said bracket member.

6. An oil drip pan assembly for a vehicle as described in claim 1, wherein said bottom wall of said receptacle has a centrally raised portion to assist in absorption of oil by said oil absorbent member and has water drainage holes being spaced along and disposed through a perimeter of said bottom wall outside and alongside said centrally raised portion.

7. An oil drip pan assembly for a vehicle as described in claim 5, wherein said receptacle also includes elongate screen support members being securely attached to and extending from interiors of said opposed side walls and being adapted to securely and removably retain said screen member.

8. An oil drip pan assembly for a vehicle as described in claim 1, wherein said receptacle comprises a pan for covering the oil pan and a bottom of the engine of the vehicle.

9. An oil drip pan assembly for a vehicle as described in claim 1, wherein said oil absorbent member comprises a sponge pad which is adapted to soak up and absorb oil being dripped into said receptacle.

10. An oil drip pan assembly for a vehicle comprising:
    a bracket member being adapted to securely attached to an undercarriage of a vehicle, said bracket member including an elongate main member having ends, and also including elongate end members securely attached at said ends of said elongate main member and extending generally perpendicular thereto, each of said elongate main and end members including an elongate upper portion, and an elongate intermediate portion integrally attached to a longitudinal edge of said elongate upper portion and being angled relative to said elongate upper portion, said elongate intermediate portion being depended downwardly relative to said elongate upper portion, each of said elongate end members further including an elongate lower portion which is integrally attached to a longitudinal edge of a respective said elongate intermediate portion and which is angled relative to said elongate intermediate portion for supporting a receptacle, said elongate intermediate portions being horizontally extended inwardly of said bracket member, said elongate upper portions of said elongate end members including holes disposed therethrough for mounting said bracket member to the undercarriage of the vehicle;
    said receptacle being removably fastened to said bracket member said receptacle including a bottom wall and a side wall assembly extending upwardly about a perimeter of said bottom wall, said receptacle further including elongate flange portions extending outwardly from a top of a portion of said side wall assembly and being adapted to rest upon and securely fasten to said elongate lower portions of said elongate end members, said side wall assembly including opposed side walls, said elongate flange portions extending along lengths of said opposed side walls and having holes disposed therethrough for fastening said receptacle to said bracket member, said bottom wall of said receptacle having a centrally raised portion to assist in absorption of oil by an oil absorbent member and also having water drainage holes being spaced along and disposed through a perimeter of said bottom wall outside and alongside said centrally raise portion, said receptacle comprises a pan for covering the oil pan and a bottom of the engine of the vehicle;
    said oil absorbent member being removably supported upon said receptacle for absorbing oil being dripped about an oil pan or from gaskets, said oil absorbent member comprises a sponge pad which is adapted to soak up and absorb oil being dripped into said receptacle; and a fire retardant screen member securely and removably disposed upon said receptacle to securely retain said oil absorbent member upon said receptacle, said receptacle also including elongate screen support members being securely attached to and extending from interiors of said opposed side walls and being adapted to securely and removably retain said screen member.

* * * * *